United States Patent [19]
Buchanan et al.

[11] Patent Number: 5,878,374
[45] Date of Patent: Mar. 2, 1999

[54] COMPUTER-CONTROLLED ELECTROMECHANICAL DEVICE FOR DETERMINING FILTRATION PARAMETERS OF A FILTER AID

[75] Inventors: Thomas A. Buchanan; Peter E. Lenz, both of Reno, Nev.

[73] Assignee: Eagle-Picher Industries, Inc., Cincinnati, Ohio

[21] Appl. No.: 826,890

[22] Filed: Apr. 9, 1997

[51] Int. Cl.⁶ .................................................. B01D 24/44
[52] U.S. Cl. .............................. 702/45; 702/47; 702/50; 210/778; 210/143; 210/86; 210/199; 364/528.01
[58] Field of Search ..................................... 210/193, 777, 210/778, 108, 424, 426, 143, 86, 87, 90, 101, 199; 702/45–47, 50, 55, 98, 99, 100, 156, 166, 170; 364/528, 528.01, 528.06–528.08, 528.16, 528.17, 528.2, 528.34, 528.36, 528.38; 73/38, 861.42, 861.46, 861.49; 137/1–3, 9, 87.02, 87.03, 87.04, 386, 392, 552.7, 554, 557–560; 377/20, 21, 25

[56] References Cited

U.S. PATENT DOCUMENTS

| | | | |
|---|---|---|---|
| 4,128,004 | 12/1978 | Caron et al. ................................. | 73/38 |
| 4,704,210 | 11/1987 | Bozee ....................................... | 210/778 |
| 5,178,153 | 1/1993 | Einzig ................................... | 73/861.42 |
| 5,236,601 | 8/1993 | Snell et al. .............................. | 210/778 |
| 5,484,536 | 1/1996 | Yanaguchi et al. ..................... | 210/108 |
| 5,635,074 | 6/1997 | Stenstrom et al. ........................ | 210/90 |
| 5,687,092 | 11/1997 | Bretmersky et al. .................... | 702/100 |

*Primary Examiner*—Hal Dodge Wachsman
*Attorney, Agent, or Firm*—Wood, Herron & Evans, LLP

[57] ABSTRACT

A device (10) for automatically determining filtration parameters for a sample of a filter aid material includes a measurement tube assembly (14) comprising a generally vertical measurement tube (34) and a septum (40) disposed within the tube for forming a filter cake of a filter aid material, a plurality of actuatable valves (V1–V12) coupled to the inlet (32) and discharge (44) of the measurement tube assembly for controlling water flow into and out of the assembly, a control and processor system (17) including a computer (200) operable to control the valves in accordance with a predetermined cycle to flush a slurry of filter aid into the measurement tube assembly and then cause water to flow under pressure through the measurement tube assembly and through a filter cake formed on the septum, and instrumentation (110, 120, 122, 130, 140) for measuring parameters needed for determining filtration parameters. The computer receives output signals from the instrumentation and calculates filtration parameters such as permeability and wet bulk density.

21 Claims, 13 Drawing Sheets

FIG. I

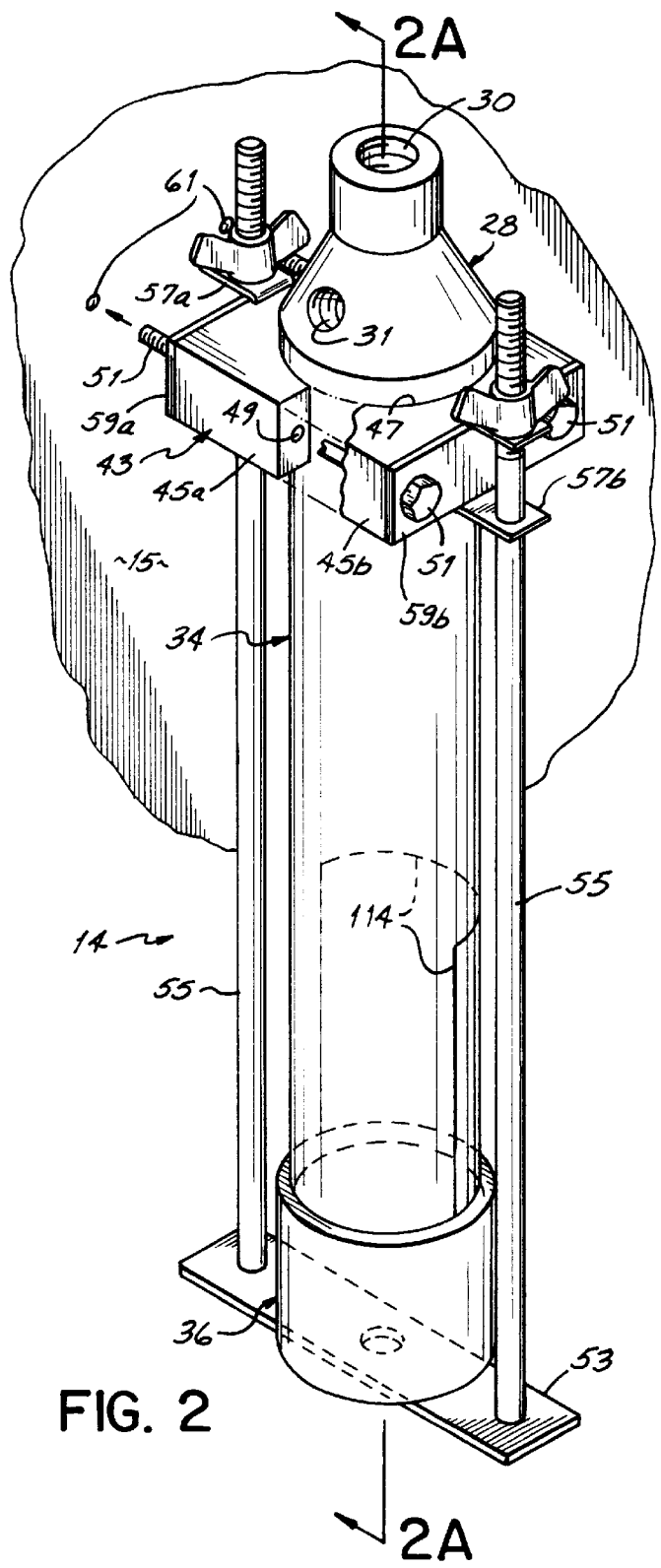
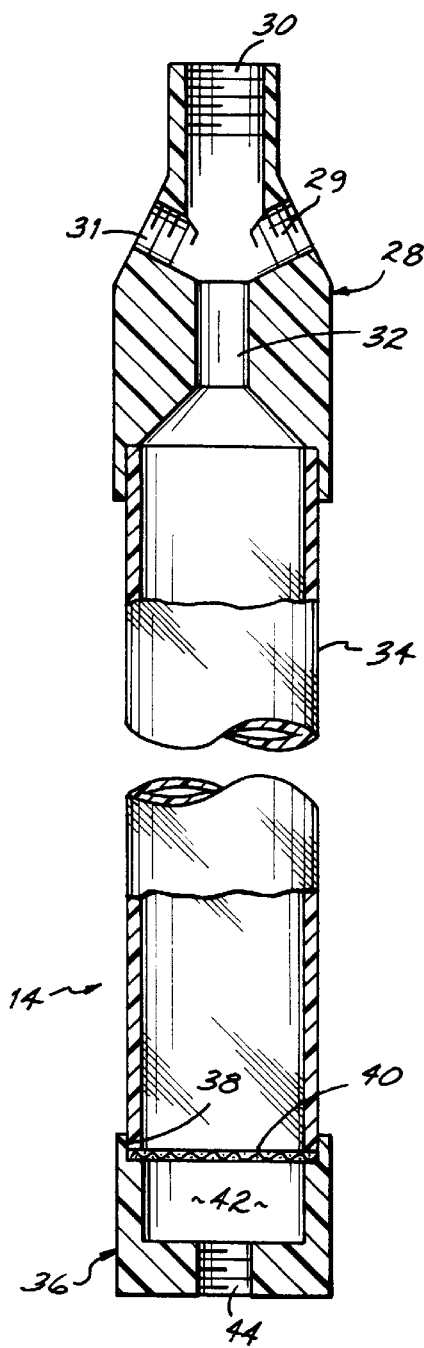
FIG. 2
FIG. 2A

COMPUTER-CONTROLLED ELECTROMECHANICAL DEVICE FOR DETERMINING FILTRATION PARAMETERS OF A FILTER AID

FIELD OF THE INVENTION

The present invention relates to a device for determining filtration parameters for a filter aid material.

BACKGROUND OF THE INVENTION

Filter aids are widely used in industrial processes for the filtration of various types of liquid mixtures containing solids in order to remove the solids therefrom. A filter aid typically exists in a solid dry powdered form, with the material and the particle size of the powder lending particular filtration characteristics to the filter aid. In many applications, particular filter aid materials are selected because they provide certain desired filtration characteristics.

The filtration characteristics of a filter aid are usually measured by a number of filtration parameters, including the permeability coefficient of the filter aid (i.e., the degree of porosity of a cake of the filter aid) expressed in "darcies", the wet bulk density expressed in grams per cubic centimeter, and the volumetric flow rate of water through the filter aid expressed in milliliters per second. Producers of filter aids frequently measure the filtration parameters of samples of the filter aids as part of a quality control procedure, so that the end user is assured of obtaining a filter aid having known filtration parameters. In addition, end users of filter aids often measure the filtration parameters of their filter aids as part of their own quality control processes.

Commonly, manual laboratory procedures are used for the determination of filtration parameters of filter aids. Such manual procedures require a laboratory technician to use a significant number of pieces of equipment and to accurately follow a predetermined series of steps and accurately measure and record data manually. For instance, the permeability of a filter cake typically is determined with the aid of a permeameter, which is a vertical cylindrical tube having a septum consisting of a stainless steel screen on which is placed a piece of filter paper to prevent a filter aid material from passing through so that a cake of the filter aid forms on the septum when a slurry of the filter aid is passed through the permeameter. The permeameter has a top cap for sealing the upper inlet port of the tube. The top cap has a pressure valve which is coupled to a pressure-regulated air supply. A bottom cap seals the lower end of the tube below the septum, and has a filtrate valve which can be opened to allow filtrate to exit the permeameter. The permeameter includes a differential pressure gauge which measures the pressure difference across the septum.

A typical manual procedure for determining the permeability of a filter aid with a permeameter is as follows: The technician weighs a sample of the filter aid and records the weight, and then transfers the sample to an Ehrlenmeyer flask and adds water to the flask to form a slurry. The technician then opens the inlet port of the permeameter and pours the sample slurry into the inlet port, and rinses the flask with additional water and adds the additional water to the inlet port to be sure all of the sample is transferred to the permeameter. The inlet port is then tightly closed and the pressure valve is opened to pressurize the permeameter. The air supply is adjusted to a predetermined pressure. The technician then must quickly open the filtrate valve and allow the water to drain to a level just above the filter cake which has formed on the septum. The filtrate is collected in the flask. The filtrate valve and pressure valves are then closed, and the inlet port is opened. The technician adds some additional water to the filtrate in the flask, and uses a funnel with a dispersion tube to transfer the water in the flask into the inlet port, being careful not to disturb the surface of the cake. Next, the inlet port is closed and the pressure valve is opened to pressurize the permeameter. The filtrate valve is opened, and after a steady flowrate is established, the technician begins collecting the filtrate in a graduated cylinder and begins timing with a stopwatch at the same moment. At that same moment, the technician must note the gauge pressure on the differential pressure gauge. The technician collects a certain amount of filtrate, and then removes the graduated cylinder and stops timing at the same moment. The technician must then note the gauge pressure again. A thermometer is used to measure the temperature of the filtrate. The permeameter is then completely drained of water, and the technician measures the thickness of the cake. Permeability of the filter aid is then calculated by the equation:

$$\text{Permeability} = \frac{V \cdot n \cdot H \cdot 14.7}{t \cdot A \cdot P}$$

where

V=volume of filtrate collected (ml)

n=viscosity (centipoise), calculated from temperature

H=cake thickness (cm)

t=time required to collect filtrate (sec)

A=pressure chamber cross-sectional area (cm$^2$)

P=pressure differential (psi)

This manual procedure is time-consuming, and is inconvenient to perform in certain environments because of the substantial amount of equipment required. Furthermore, the procedure is subject to inaccuracy and inconsistent results because of the dependence on the technician manually running all phases of the experiment and reading and recording data.

SUMMARY OF THE INVENTION

It is therefore an object of the present invention to provide an improved method and apparatus for determining filtration parameters of filter aids which reduces the amount of operator time required.

It is a further object of the invention to provide an apparatus and method for determining filtration parameters which are convenient to use both in a laboratory or manufacturing facility as well as in the field.

It is a further object of the invention to provide an apparatus and method for determining filtration parameters which achieve more accurate and consistent results than are possible using manual procedures.

The present invention overcomes the above-noted drawbacks of prior apparatus and methods for determining filtration parameters of filter aids. To this end, and in accordance with the principles of the present invention, a computer-controlled electromechanical device for determining filtration parameters is provided which significantly reduces the amount of operator time required, which is portable and therefore convenient to use in many different settings, and which achieves results that are more accurate and repeatable than possible with manual procedures.

A device in accordance with the present invention includes a measurement tube assembly comprising a generally vertical measurement tube and a septum disposed within the tube for forming a filter cake of a filter aid material, a plurality of actuatable valves coupled to the inlet and discharge of the measurement tube assembly for controlling water flow into and out of the assembly, a control and processor system operable to control the valves in accordance with a predetermined cycle to flush a slurry of filter aid into the measurement tube assembly and then cause water to flow under pressure through the measurement tube assembly and through a filter cake formed on the septum, and instrumentation for measuring parameters needed for determining filtration parameters. The control and processor system receives output signals from the instrumentation and calculates filtration parameters such as permeability and wet bulk density.

More particularly, the plurality of valves comprise a flush or pinch valve coupled to the inlet of the measurement tube assembly, the pinch valve being actuated by the control and processor system to permit a slurry of filter aid to be flushed into the measurement tube assembly; and a measurement tube water supply valve which couples the inlet of the measurement tube assembly to a water supply. The instrumentation includes a flow measurement device which provides an output signal as a function of the flow rate through the discharge of the measurement tube assembly, a cake detector which provides an output signal as a function of the cake thickness, and a differential pressure sensor which provides an output signal as a function of the pressure drop across the measurement tube assembly. The flow measurement device advantageously comprises an orifice located downstream of the discharge of the measurement tube assembly and a "fast flow" differential pressure sensor which measures the pressure drop across the orifice, which pressure drop correlates with flow rate according to a known calibration of the orifice.

Advantageously, the device also includes a temperature sensor which provides an output signal to the control and processor system as a function of the temperature of the water supply, which is used for calculating the viscosity of the water. The device advantageously further includes a mix tank for receiving a sample of filter aid, the mix tank being coupled to the water supply via a valve which is actuatable by the control and processor system to open to permit water to flow into the mix tank to form a slurry of the filter aid. The outlet of the mix tank is coupled to the inlet of the measurement tube assembly via the pinch valve.

The device advantageously also includes a backwash system for breaking up the filter cake after data has been collected and processed, and carrying the filter aid out the top of the filter tube assembly and to a drain line. The backwash system includes a pressure-regulated air supply, a backwash drain valve coupling the inlet of the measurement tube assembly with the drain line, a backwash water supply valve coupling the water supply with the discharge of the measurement tube assembly, a backwash air supply valve coupling the air supply with the discharge of the measurement tube assembly, and a measurement tube drain valve connected between the discharge of the measurement tube assembly and the drain line. The control and processor system is programmed to initiate a backwash cycle after calculation of the filtration parameters has been completed. In the backwash cycle, the measurement tube water supply valve is closed to disconnect the inlet of the measurement tube assembly from the water supply, and the measurement tube drain valve is closed to disconnect the discharge of the measurement tube assembly from the drain line. The backwash drain valve is then opened, and the backwash water and air supply valves are opened to cause pressurized water and air to enter the discharge of the measurement tube assembly and break up the filter cake and flush the cake upward through the inlet of the measurement tube assembly and to the drain line.

The device advantageously further includes a slow flow tube and a system for diverting flow into the slow flow tube upon detection of a water flow rate below a predetermined level, which occurs when testing very fine-grained filter aids that form filter cakes having low porosity. The control and processor system diverts flow into the slow-flow tube upon detection of a low-flow condition and slow cake formation based on the output signals from the "fast flow" pressure sensor and the cake detector. A low-range pressure sensor located at the lower end of the slow-flow tube is used to measure the pressure exerted by the column of water in the tube at a given instant in time, and the control and processor system determines the amount of time the water has been flowing into the tube. The volume of water within the tube at that instant is calculated from the pressure sensor measurement, from which flow rate is calculated by dividing volume by elapsed time. The slow-flow tube affords improved accuracy relative to the flow rate that would be measured by the primary orifice and "fast flow" differential pressure sensor.

The control and processor system is programmed to control the various valves to automatically form a slurry in the mix tank, flush the slurry into the measurement tube assembly, flow water under pressure through the measurement tube assembly, diverting the flow through the slow flow tube if the flow rate is below a predetermined level, collect data on the flow rate, cake thickness, water temperature, and pressure drop across the measurement tube assembly, calculate filtration parameters for the filter aid sample, and backwash the filter cake from the measurement tube assembly in preparation for the start of another testing cycle.

The above-noted and other objects and advantages of the present invention will become more apparent from the following detailed description of a specific embodiment of the invention taken in conjunction with the accompanying drawings.

BRIEF DESCRIPTION OF THE DRAWINGS

FIG. 2 is a perspective view of the measurement tube assembly of a device in accordance with the principles of the present invention.

FIG. 2A is a cross-sectional view of the measurement tube assembly taken along line 2A—2A of FIG. 2.

DETAILED DESCRIPTION OF A SPECIFIC EMBODIMENT

Figure 1:
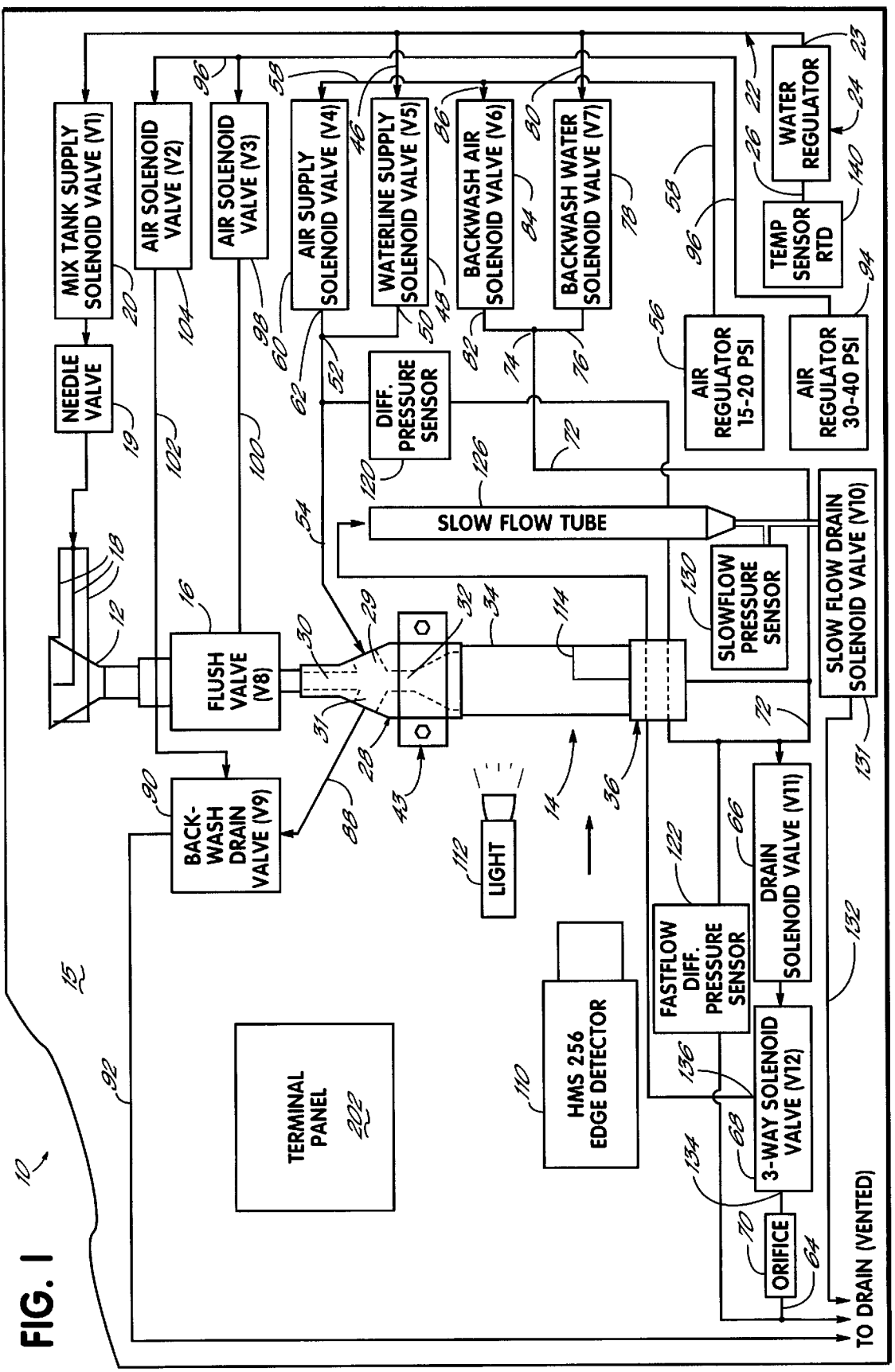
FIG. 1 is a schematic representation of a device in accordance with the principles of the present invention showing the plumbing and instrumentation layout for the device.

FIG. 1 schematically depicts a device 10 in accordance with the principles of the present invention. The device includes a mix tank 12 into which a sample of filter aid is deposited for forming a slurry, and a measurement tube assembly 14 which receives the slurry from the mix tank 12. The measurement tube assembly 14 is secured to a chassis 15 via a clamp assembly described in further detail below. A pinch or flush valve 16 connects the mix tank 12 to the measurement tube assembly 14 and is actuated to open and close by a control system 17 as described in detail below.

Water is supplied to the mix tank 12 by water lines 18, which are connected to a main water supply line 22 via a mix tank supply solenoid valve 20 which is normally closed in its unactuated position. A needle valve 19 couples the mix tank solenoid valve 20 with the water lines 18 for regulating the rate of flow into the mix tank 12 when the solenoid valve 20 is open. The main water supply line 22 receives water from the outlet 23 of a water pressure regulator 24. The inlet 26 of the water pressure regulator 24 is connected to a suitable water supply (not shown). Advantageously, the water supply should have a pressure of at least about 30 psi, and the water pressure regulator 24 should provide a pressure at the outlet 23 of about 15 to 20 psi.

With reference to FIGS. 2 and 2A, the measurement tube assembly 14 has a top cap 28 which includes a water-air inlet 29, a slurry inlet 30, and a backwash outlet 31 all of which are connected to a common passage 32. The top cap 28 is attached to the upper end of a transparent cylindrical measurement tube 34 such that the top cap common passage 32 and the tube 34 form a continuous flowpath. The tube 34 advantageously has an inner diameter of about 1.75 inches and an outer diameter of about 2.0 inches. A bottom cap 36 is attached to the lower end of the measurement tube 34. The bottom cap 36 has a cylindrical passage 38 which receives the lower end of measurement tube 34. A septum 40 is affixed within the cylindrical passage 38. The septum advantageously is constructed of a polyethylene monofilament cloth sandwiched between a pair of stainless steel 16-mesh, 0.5 mm diameter wire screens. A cylindrical chamber 42 below the septum 40 is connected to a discharge passage 44. Advantageously, silicone sealant is used to seal the connections between the measurement tube 34 and the top cap 28 and bottom cap 36.

A clamp assembly 43 secures the measurement tube assembly 14 to the chassis 15. The clamp assembly 43 includes clamp members 45a and 45b which mate to form a cylindrical hole 47 which receives the top cap 28 of measurement tube assembly 14. Holes 49 through clamp members 45a and 45b receive threaded bolts 51. Bolts 51 engage threaded holes 61 in the chassis 15 for securing the clamp assembly 43 to the chassis. The lower end of the measurement tube assembly is supported by a steel strap 53 which is connected to the clamp members 45a and 45b by threaded rods 55. Rods 55 engage U-shaped brackets 57a and 57b which are clamped between clamp member 45a and plate 59a and between clamp member 45b and plate 59b, respectively.

Water is supplied from the main water supply line 22 to the water-air inlet 29 in top cap 28 via a water line 46, a solenoid valve 48, a water line 50, a water-air coupling 52, and a measurement tube supply line 54. Solenoid valve 48 is normally closed in its unactuated position. Air is supplied to the water-air inlet 29 by a low-pressure air regulator 56 via a low-pressure air supply line 58, an air supply solenoid valve 60 (normally closed), an air line 62 which connects to the water-air coupling 52, and the measurement tube supply line 54. The air regulator 56 is advantageously set to provide air to line 58 at about 15–20 psi. A suitable air regulator for this purpose is Model R302 supplied by Metalwork Air Products of Spartenburg, S.C. As described in greater detail below, compressed air is supplied through the water-air inlet 29 for two different purposes. First, during cake formation with faster grades of filter aids, differential settling of the solids must be minimized in order to form a uniform thickness cake. To this end, compressed air is used to pressurize the measurement tube assembly during cake formation to lower the height of the water column and increase solids concentration. Second, compressed air is used to purge the measurement tube of water after a testing cycle has been completed in order to prepare the device for the start of another cycle.

The discharge 44 of measurement tube assembly 14 is connected to a drain line 64 via a solenoid drain valve 66 (normally open), a three-way universal solenoid valve 68, and an orifice 70. The three-way valve 68 is normally open to the orifice 70. The orifice 70 advantageously has a diameter of about $\frac{1}{16}$-inch. The discharge 44 of measurement tube assembly 14 is also connected to the main water supply line 22 via a water line 72, a water-air coupling 74, a water line 76, a backwash water solenoid valve 78 (normally closed), and a water line 80. The water-air coupling 74 is also connected via an air line 82 to a backwash air solenoid valve 84 (normally closed) which is connected to the low-pressure air supply line 58 via an air line 86. As described in detail below, the control system is programmed to backwash the measurement tube assembly 14 to break up the filter cake and remove it from the measurement tube assembly after data have been collected, by closing the drain solenoid valve 66 and the water and air solenoid valves 48 and 60 and opening the backwash water and air solenoid valves 78 and 84 to cause water and air to flow into the discharge 44 of measurement tube assembly 14. The broken up cake of filter aid material is carried upward through the common inlet passage 32 of top cap 28 and out of the backwash outlet 31, through a line 88 to a backwash drain valve 90, and to a backwash drain line 92. The control system opens the backwash drain valve 90 to allow the broken up cake and water-air mixture to be flushed to drain line 92.

The pinch valve 16, which is normally open, is actuated to close by compressed air supplied by a high-pressure air regulator 94, which advantageously is set to provide air at about 30–40 psi. A suitable air regulator 94 for this purpose is Model R302 supplied by Metalwork Air Products of Spartenburg, S.C. The high-pressure air regulator 94 is connected to the pinch valve 16 via a high-pressure air supply line 96, a three-way universal air solenoid valve 98 (normally open to vent), and an air line 100. The backwash drain valve 90 is also actuated by high-pressure air from regulator 94, and is connected thereto via an air line 102, a three-way universal air solenoid valve 104 (normally open to vent), and high-pressure air supply line 96.

Suitable solenoid valves 20, 48, 60, 78, and 84 include stainless steel ¼-inch NPT, ³⁄₃₂-inch orifice solenoid valves (10W, 275 psi, 120 V) available from Honeywell (Skinner) of New Britain, Conn. (part number 71215SN2KN00N0C111P3). Suitable three-way universal solenoid valves 68, 98, and 104 include brass ¼-inch NPT, ³⁄₃₂-inch orifice solenoid valves (14 W, 500 psi, 120 V) available from Dayton Company of Niles, Ill. Suitable solenoid valves 66 and 131 include stainless steel ¼-inch NPT, ¹⁄₁₆-inch orifice solenoid valves (10W, 325 psi, 120 V) available from Honeywell (Skinner) of New Britain, Conn. (part number 71295SN2GNJ1N0C111P3).

The device 10 includes instrumentation for measuring cake thickness, pressure drop across the measurement tube assembly, and flow rate out of the measurement tube assembly. Cake thickness is determined with the aid of an optical edge or cake detector 110 which, in known manner, provides an output signal as a function of the position of an upper edge of a cake formed on the septum 40. As described below, the control system is programmed to begin a measurement phase of the testing cycle when the output signal of the cake detector 110 indicates that the cake has stopped growing. A suitable edge detector for use with the present invention is Model HMS-256-125, manufactured by Honeywell (Microswitch) of Freeport, Ill. A light 112 mounted adjacent the measurement tube assembly 14 provides sufficient light for the proper functioning of the edge detector 110. Additionally, the measurement tube 34 advantageously is covered with black opaque tape 114 or an equivalent material on the side of the tube opposite the cake detector 110 in the vicinity of the septum, to provide a backdrop for the cake detector which assures a high contrast with the cake material.

The pressure drop across the measurement tube assembly 14 is determined by a differential pressure (DP) sensor 120 connected between the measurement tube supply line 54 and the discharge of the measurement tube assembly 14. Advantageously, the DP sensor 120 is capable of measuring differential pressures up to about 15 psi. The DP sensor 120 provides an output signal to the control system as a function of the pressure drop across the measurement tube assembly.

The flow rate out of the measurement tube assembly 14 is determined by a differential pressure sensor or "fast-flow (FF)" sensor 122 which is connected between the discharge of the measurement tube assembly 14 and the discharge of the orifice 70. The FF sensor 122 advantageously is capable of measuring differential pressures up to about 15 psi. The FF sensor 122 provides an output signal to the control system as a function of the pressure drop across the orifice 70. The control system calculates flow rate based on a known correlation between flow rate and pressure drop for the orifice 70.

Differential pressure sensor Model MPX2100DP (0–14.5 psi, 5–10 VDC input, 0–60 mV output) available from Motorola Corporation of Phoenix, Ariz. is suitable for DP sensor 120 and FF sensor 122.

With certain slow-flowing filter aids, the flow rate through the orifice 70 may become so low that the FF sensor 122 is not capable of measuring the slight pressure drop across the orifice 70 with sufficient accuracy to enable an accurate calculation of flow rate. To remedy this, the device 10 includes a slow-flow tube 126 which has a low-range pressure sensor or "slow-flow (SF)" sensor 130 located at the lower end of the tube in fluid communication with water in the tube. The SF sensor 130 advantageously is capable of measuring pressures of about zero to 1.5 psi. Flow from the measurement tube assembly is diverted to the slow-flow tube 126 by the three-way valve 68. The three-way solenoid valve 68 includes a first outlet 134 which supplies flow to the orifice 70 under fast-flow conditions, and a second outlet 136 which supplies flow to the slow-flow tube 126 under slow-flow conditions. The slow-flow tube 126 is connected to a drain line 132 via a slow-flow drain valve 131. As further described below, the control system operates the three-way solenoid valve 68 to divert flow through the second outlet 136 to the slow-flow tube 126 when the pressure drop measured by the FF pressure sensor 122 falls below a predetermined level indicating a slow-flow condition. Pressure sensor Model MPX2010GP (0–0.45 psi, 5–10 VDC input, 0–60 mV output) available from Motorola Corporation of Phoenix, Ariz. is suitable for SF sensor 130. While this Motorola sensor is of the differential pressure type, a gauge sensor may be used instead.

The instrumentation also includes a temperature sensor 140 which measures the temperature of the water supply at the inlet 26 of the water pressure regulator 24. The temperature sensor 140 advantageously is a 100-ohm three-wire resistance temperature device (RTD). The temperature sensor 140 provides an output signal to the control system 17 as a function of the temperature of the water supply, from which the viscosity of the water is calculated for determining filtration parameters. A suitable temperature sensor is Model E-93560-02 (100-ohm, 20K resistor three-wire) available from Cole-Parmer Company of Vernon Hills, Ill.

Figure 3:
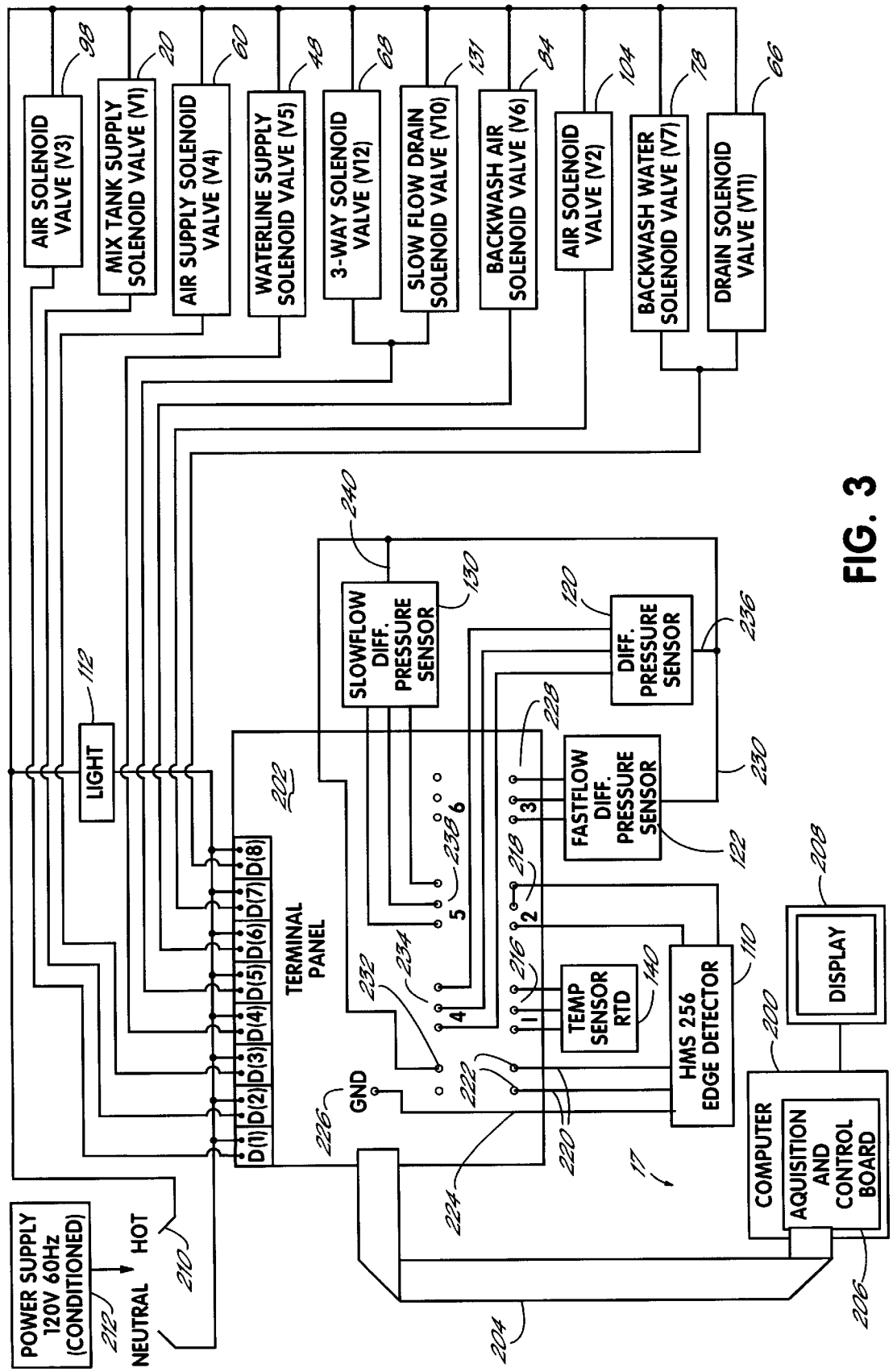
FIG. 3 is an electrical schematic of the device of FIG. 1 showing the connections between the control system and the valves and instrumentation.

FIG. 3 depicts the electrical connections between the control system 17 and the valves and instrumentation of the device 10. The control system 17 includes computer 200 which is connected to the solenoid valves via a terminal panel 202. A ribbon cable 204 connects the terminal panel 202 to a data acquisition and control board 206 within computer 200. The computer is connected to a display monitor 208 which displays operator prompts and the results of calculations performed by the computer 200.

The control system also includes relays D(1) through D(8) which are connected to the terminal panel 202. Each of the relays is connected between the hot side 210 of a 120 V, 60 Hz conditioned power supply 212 and one or more of the solenoid valves. More particularly, relay D(1) is connected to the air solenoid valve 98 which supplies air for actuating the flush valve 16. Relay D(2) is connected to mix tank supply solenoid valve 20. Relay D(3) is connected to measurement tube air supply solenoid valve 60. Relay D(4) is connected to measurement tube water supply solenoid valve 48. Relay D(5) is connected to both three-way universal solenoid valve 68 and slow-flow tube drain solenoid valve 131, so that when relay D(5) closes, three-way valve 68 is actuated to divert flow through second outlet 136 to slow-flow tube 126 and simultaneously slow-flow tube drain valve 131 is actuated to close to allow the slow-flow tube 126 to begin filling with water. Relay D(6) is connected to backwash air solenoid valve 84. Relay D(7) is connected to three-way universal solenoid valve 104 which supplies air for actuating the backwash drain valve 90. Finally, relay D(8) is connected to both the backwash water solenoid valve 78 and the measurement tube drain solenoid valve 66, so that when relay D(8) is closed to actuate water valve 78 to backwash the measurement tube, drain valve 66 simultaneously closes to prevent the backwash water and air from being discharged to drain line 64. Suitable relays are available from Strawberry Tree, Inc. of Sunnyvale, Calif., as Model OAC-5 (solid state, optically isolated, 120 V).

Terminal panel 202 includes analog channels which are connected to the instrumentation for communicating the analog signals to the data acquisition and control board 206. A suitable terminal panel is Model T31B-L10 available from Strawberry Tree, Inc. of Sunnyvale, Calif. Each channel has a positive, a negative, and a common terminal. The terminal panel 202 also includes DC power supply terminals for supplying electrical power to the instrumentation. More particularly, the leads of the three-wire RTD 140 are connected to the positive, negative, and common terminals 216 of channel 1. Edge detector 110 is connected to the terminals 218 of channel 2 (one lead to positive and one lead to both negative and common). Edge detector 110 also has power input leads 220 which are connected to 12-volt DC power supply terminals 222 and ground wire 224 which is connected to ground terminal 226. FF sensor 122 is connected to terminals 228 of channel 3 and has a power input lead 230 which is connected to 6.9-volt DC power supply terminal 232. DP sensor 120 is connected to terminals 234 of channel 4 and has a power input lead 236 connected to power supply terminal 232. SF sensor 130 is connected to terminals 238 of channel 5 and has a power input lead 240 connected to power supply terminal 232.

Figure 4:
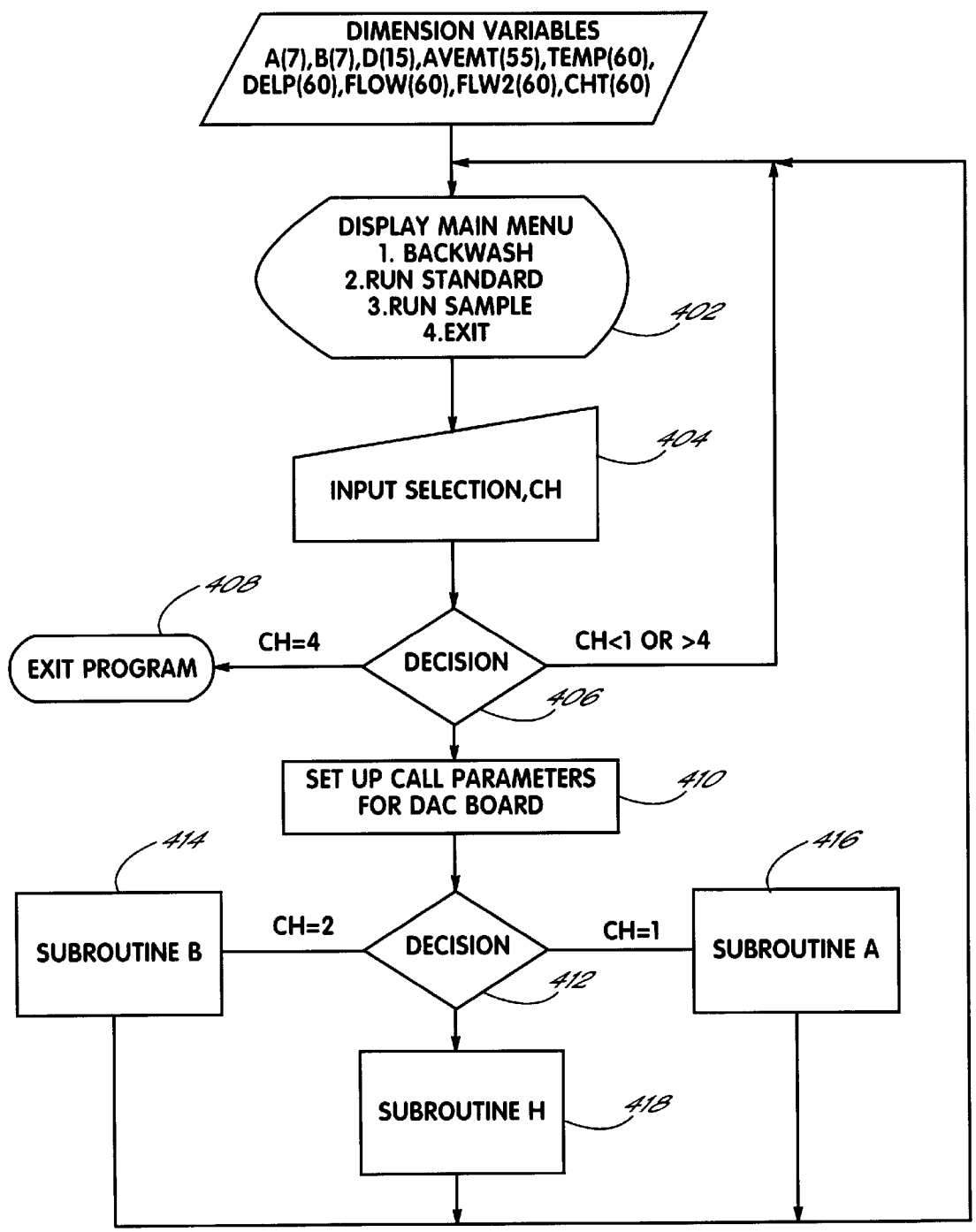
FIG. 4 is a flowchart showing the overall operation of the control and processor system of the device.

The device 10 is operable in a number of modes, including running a sample of material of unknown properties, running a "standard" material of known properties for calibrating the device, and backwashing the device. FIG. 4 depicts a flowchart of the computer's main control program which controls the valves and acquires and processes data from the instrumentation in different ways depending upon the operating mode selected by an operator. Upon start-up of the device 10, the computer 200 and data acquisition and control (DAC) board 206 perform a self-calibration, and then compile and execute the control program. The display 208 at 402 presents the operator with a menu of four choices:

1. Backwash Cycle
2. Run a Standard
3. Run a Sample
4. Exit

The operator selects "Run a Sample" when it is desired to determine filtration parameters for a sample of filter aid material of unknown filtration characteristics, or alternatively selects "Run a Standard" when it is desired to determine filtration parameters for a standard filter aid. Prior to beginning a sample or standard run cycle, the measurement tube assembly 14 must be free of any water or filter aid material from prior runs. To clean the measurement tube assembly, the operator may run a backwash cycle (menu choice 1) before initiating a sample or standard run.

Upon the operator inputting a selection CH at 404, the program at 406 executes a decision branch, exiting the program at 408 if CH=4, and returning to the menu if CH is out of range; otherwise, the program sets up call parameters for the DAC board at 410. At 412, the program executes a decision branch, performing Subroutine B at 414 if CH=2 (Run a Standard), or performing Subroutine A at 416 if CH=1 (Backwash); otherwise, the program performs Subroutine H (Sample Routine) at 418.

Figure 5:
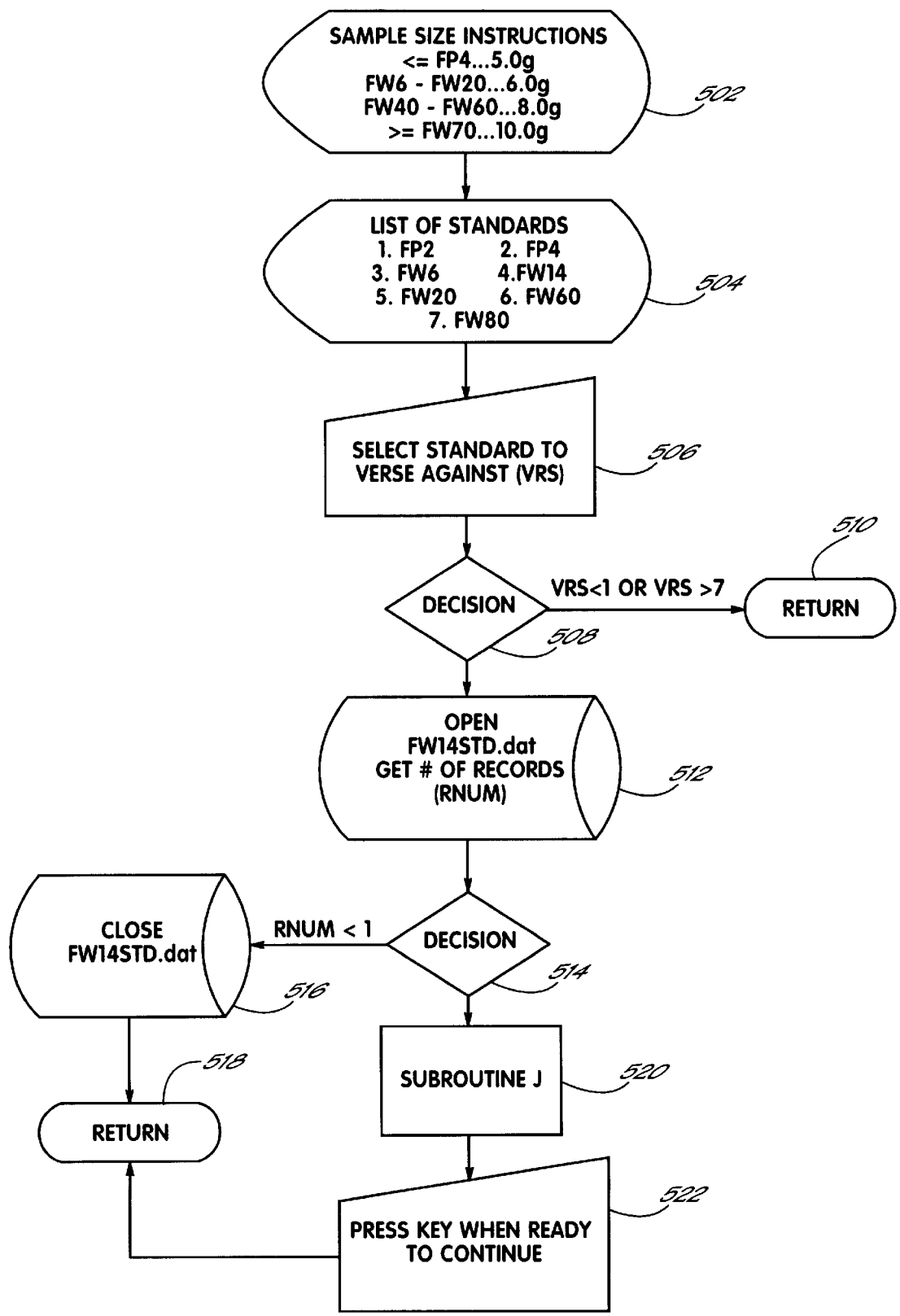
FIG. 5 is a flowchart showing the overall process steps for a sample run cycle of the device.

FIG. 5 depicts Subroutine H for running a sample run cycle. At 502, the program displays instructions on display 208 as to what sample size to use depending on the filter standard to which the sample is to be compared. At 504, the program displays a menu of filter standard choices from one to seven. The operator inputs a selection (VRS) at 506. At 508, the program executes a decision branch, returning to the main program at 510 if the value of VRS is out of range, otherwise proceeding at 512 to open a data file which contains the results of the filtration parameter calculations (described below in connection with FIG. 7) for a number (RNUM) of previous accepted "standard" runs of the device for the particular filter standard corresponding to VRS. At 514, if the number of data sets is less than one (meaning there is no standard data for comparing), the program closes the data file at 516 and returns to the main program at 518; otherwise, the program at 520 performs Subroutine J (Control Subroutine), which controls the valves and acquires and processes data from the instrumentation to determine filtration parameters for the filter aid being tested, as described in connection with FIGS. 5A–5C below. After execution of Subroutine J, the program at 522 prompts the operator to press any keyboard key when ready to continue, whereupon the program returns to the main program at 518.

Figure 5A:
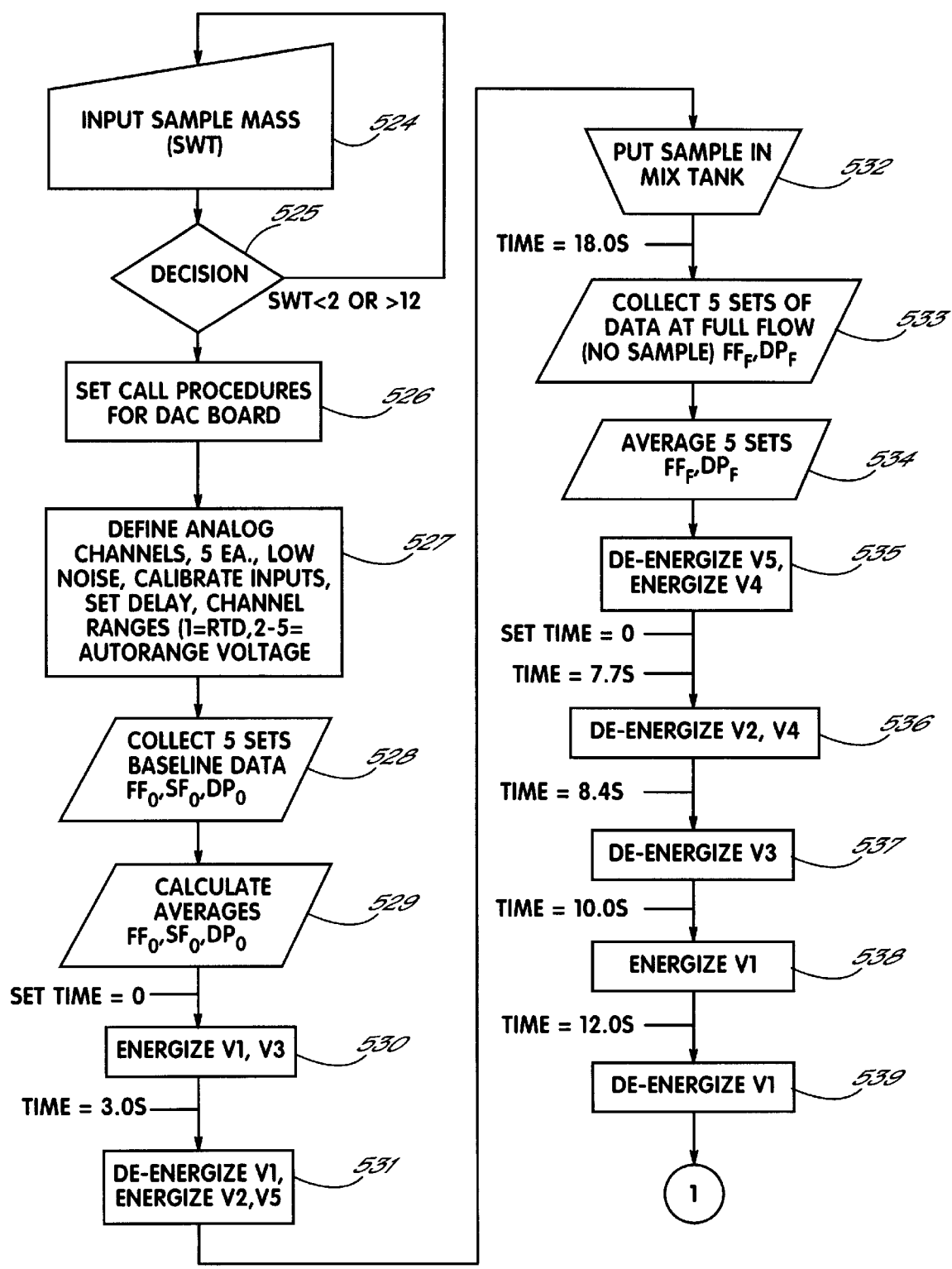
FIGS. 5A–5C depict a flowchart of the operation of the control program subroutine for controlling the valves and acquiring data from the instrumentation during either a sample run cycle or a standard run cycle of the device.
Figure 5B:
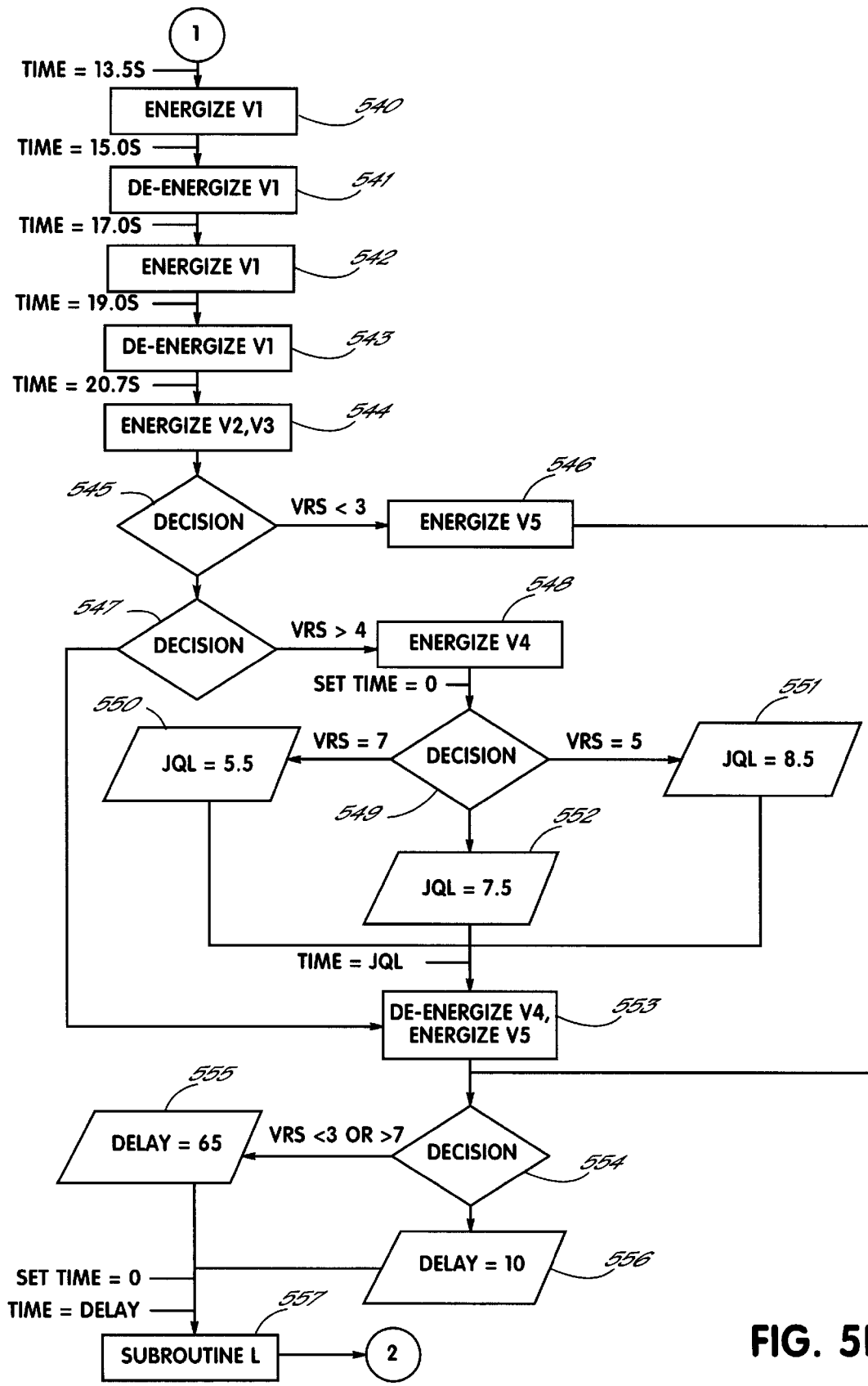
Figure 5C:
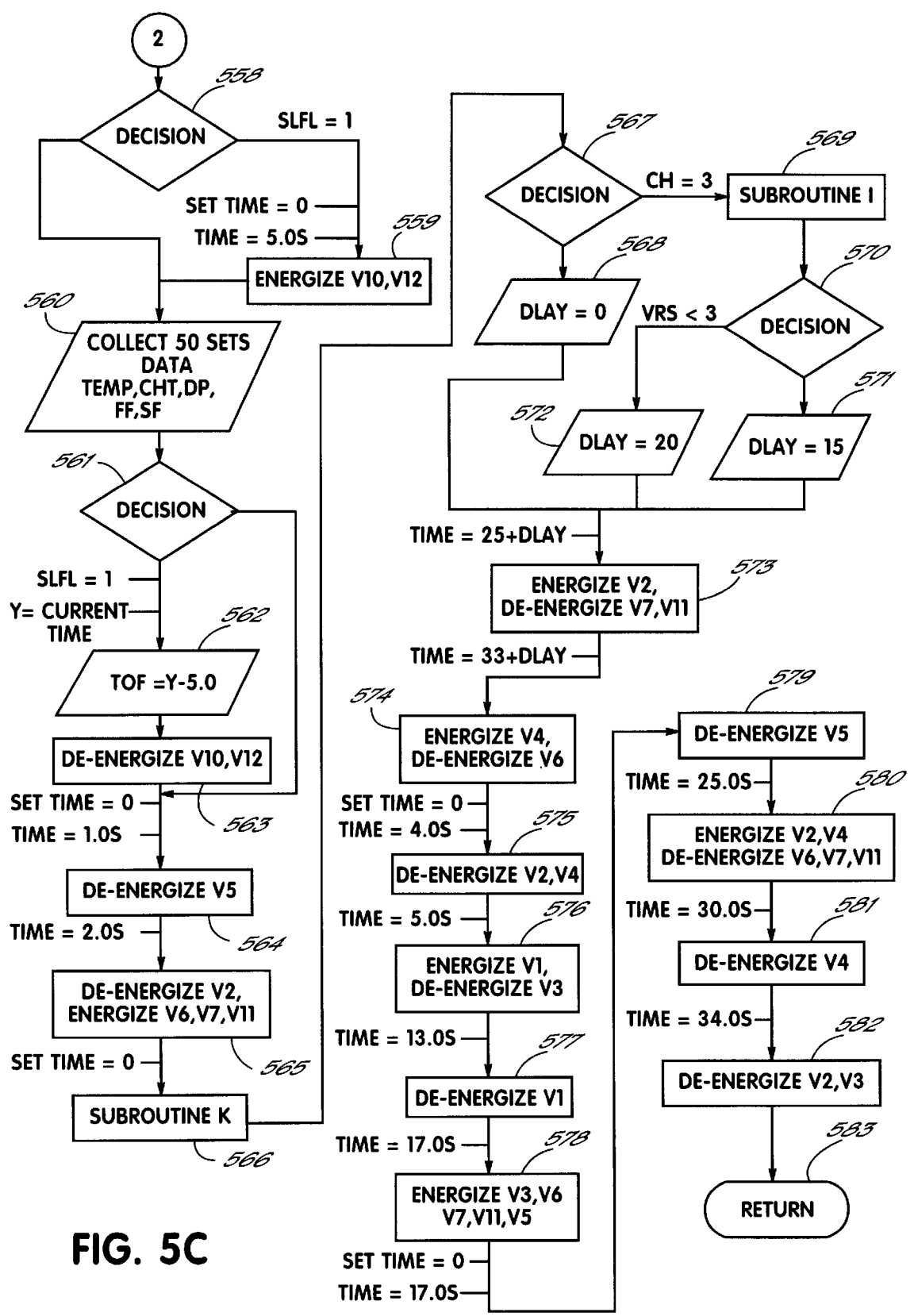

FIGS. 5A–5C depict the Control Subroutine J. For convenience, the various valves are given shorthand designations such as V1, V2, etc., on FIGS. 5A–5C. FIG. 1 shows the correspondence between these shorthand designations and the reference numerals previously referred to in connection with FIG. 1. With reference to FIG. 5A, at 524, the program prompts the operator to input the mass of the sample, SWT. At 525, if the input value of SWT is less than 2 grams or more than 12 grams, the program returns to prompt the operator to re-enter the mass. At 526, the program sets up call procedures for the DAC board, and at 527 defines analog channels, calibrates their inputs, and sets delays and channel ranges. At 528, while no water is flowing through the measurement tube assembly, the program collects five sets of baseline data from the FF sensor 122, the SF sensor 130, and the DP sensor 120. At 529, the five sets of data are averaged. These averaged baseline data are used in calculating filtration parameters as described below in connection with FIG. 7.

Next, at 530 the program sets the internal clock to zero and energizes (opens) the mix tank supply solenoid valve 20 causing water to flow through the valve 20 into the mix tank 12 and energizes (opens) the flush air solenoid valve 98 causing air pressure to be applied to close the flush valve 16. At 531, when the internal clock time is equal to 3.0 seconds, the mix tank supply solenoid valve 20 is de-energized (closed) causing the water to stop flowing into the mix tank, the air solenoid valve 104 is energized (opened) to apply air pressure to close the backwash drain valve 90, and the measurement tube water supply solenoid valve 48 is energized (opened) to cause water to flow through the measurement tube assembly at full flow. At this point, the mix tank is full of water. At 532, the operator is prompted to place the filter aid sample into the mix tank. At 533, when the internal clock time is equal to 18.0 seconds, the program collects five sets of data from the FF sensor 122 and the DP sensor 120 at full flow. The five sets of data are averaged at 534, for use as baseline calibration values as described below in connection with FIG. 7.

At 535, the program de-energizes the water supply valve 48 to stop the water flow through the measurement tube assembly, energizes (opens) the measurement tube air supply solenoid valve 60 to pressurize the measurement tube to force the remaining water out of the measurement tube and to the drain line 64, and resets the internal clock to zero. At 536, when the clock time equals 7.7 seconds, the air solenoid valve 104 is de-energized to open the backwash drain valve 90 and the measurement tube air supply solenoid valve 60 is de-energized (closed) to stop pressurizing the measurement tube. At 537, when the clock time equals 8.4 seconds, the air solenoid valve 98 is de-energized to open the flush valve 16, which allows the water-sample slurry in the mix tank to flow into the measurement tube assembly.

With reference to FIGS. 5A and 5B, at 538–543, the mix tank water supply valve 20 is periodically energized (opened) and then de-energized (closed) to rinse the mix tank of any remaining sample residue. At 544, when the clock time equals 20.7 seconds, the air solenoid valve 104 is energized to close the backwash drain valve 90 and the air solenoid valve 98 is energized to close the flush valve 16. At 545, the program executes a decision branch: if the standard identifier VRS is less than 3 (meaning the filter aid standard for comparison purposes is either FP2 or FP4, which are relatively slow-flowing materials), then the measurement tube water supply valve 48 is energized at 546 to cause water to flow through the measurement tube, and the program then bypasses steps 547–553 and goes to step 554. If, however, VRS is not less than 3, then the program at 547 executes a decision branch: if VRS is not greater than 4, the program bypasses steps 548–552 and goes to step 553; if VRS is greater than 4 (meaning the filter standard for comparison is FW20, FW60, or FW80, which are relative fast-flowing materials), then the program at 548–552 executes a series of steps the purpose of which is to pressurize the measurement tube in order to quickly reduce the volume of water in the measurement tube and thereby increase the solids concentration within the tube. This has been found to be advantageous in forming filter cakes of more uniform thickness with relative fast-flowing filter aids. Without such pressurization, the filter material tends to settle on the septum differentially, resulting in non-uniform thickness cakes and heterogenous flow paths, which in turn result in less accurate measurement of cake thickness and more variability in flow and hence less accurate calculations of filtration parameters.

Thus, with the faster-flowing materials, the program at 548 energizes the air solenoid valve 60 to pressurize the measurement tube, and at 549 resets the clock to zero and executes a decision branch: if VRS is equal to 5 (i.e., FW20 standard), a time parameter JQL (the length of time that valve 60 remains open) at 551 is set to 8.5 seconds; if VRS is equal to 7 (i.e., FW80 standard), JQL is set to 5.5 seconds at 550; otherwise, JQL is set to 7.5 seconds at 552. Then, at 553, when the clock time is equal to JQL, the valve 60 is de-energized to stop pressurization of the measurement tube and water supply valve 48 is energized to cause water to flow through the measurement tube assembly.

Next, at 554 the program executes a decision branch: if VRS is less than 3 (i.e., slow-flowing filter aids, which are slower to form filter cakes than faster-flowing materials) or greater than 7 (out of range), a time delay parameter DELAY is set to 65 seconds and the clock is reset to zero at 555; otherwise, DELAY is set to 10 seconds and the clock is reset to zero at 556. At 557, when the clock time is equal to DELAY, the program executes Subroutine L, which determines when the filter cake has been fully formed so that the measurement phase of the testing cycle may begin. Subroutine L is described below in connection with FIG. 6.

With reference to FIG. 5C, after the cake formation is complete as determined by Subroutine L, the program at 558 executes a decision branch based on a parameter SLFL returned by Subroutine L: if SLFL is equal to 1, which means that the program has determined that the flow rate as measured by the FF sensor is below a predetermined limit such that the flow rate measurement accuracy of the FF sensor is not acceptable, then the clock is reset to zero and when the clock time is equal to 5.0 seconds, at 559, the slow flow drain valve 131 and three-way valve 68 are energized to divert flow to the slow-flow tube 126; if SLFL is not equal to 1, then the program goes to step 560.

The data collection process is then commenced. At 560, the program collects 50 sets of data from the RTD 140, the cake detector 110, the DP sensor 120, the FF sensor 122, and the SF sensor 130. Although both FF and SF sensor data are collected, only the appropriate set is used in calculating flow rate depending on the value of SLFL, as discussed below in connection with FIG. 6. At 561, the program executes a decision branch: if SLFL is equal to 1, then a parameter Y is set equal to the current clock time and a parameter TOF, which represents the elapsed time during which water has been flowing into the slow-flow tube, is calculated at 562, and at 563 the slow flow drain valve 131 and three-way valve 68 are de-energized to stop diverting flow to the slow-flow tube; otherwise, if SLFL is not equal to 1, the program bypasses steps 562 and 563.

The program next performs a backwashing operation in order to break up the filter cake and flush it out through the backwash drain valve 90 to drain line 92. Thus, the program resets the clock to zero, and at 564 when the clock time equals 1.0 second, the control system de-energizes the water supply valve 48 to stop the water flow into the measurement tube assembly. At 565, when the time equals 2.0 seconds, the air solenoid valve 104 is de-energized to open the backwash drain valve 90, backwash water and air valves 78 and 84 are energized (opened), and simultaneously the drain solenoid valve 66 is energized (closed), so that water and air are forced upward through the measurement tube discharge passage 44 to break up the cake and carry it upward through the backwash outlet 31 to line 88 and through valve 90 to drain line 92. While the backwash operation is being carried out, the clock is reset to zero and at 566 the Subroutine K (Calculation subroutine) is performed, as discussed below in connection with FIG. 7.

At 567, a decision branch is then executed: if CH is equal to 3 (i.e., a sample run was selected), then a Sample Results Subroutine is performed at 569, and at 570–572 a parameter DLAY is set to 20 if VRS is less than 3 (i.e., standard for comparison is FP2 or FP4) and otherwise is set to 15; if CH is not equal to 3, then DLAY is set to zero at 568. The Sample Results Subroutine saves the results of calculations from Subroutine K in a data file and displays certain selected parameters such as water flow rate, wet bulk density, and permeability. When the clock time is equal to 25+DLAY seconds, at 573 the air solenoid valve 104 is energized to close the backwash drain valve 90, backwash water valve 78 is de-energized (closed) to stop the backwash water flow, and drain valve 66 is de-energized (opened).

When the clock time is equal to 33+DLAY, at 574 the air solenoid valve 60 is energized (opened) and the backwash air solenoid valve 84 is de-energized (closed), so that compressed air flows through the measurement tube assembly to expel any remaining water through the discharge to drain line 64. The clock is then reset to zero, and when the clock time equals 4.0 seconds at 575 the air solenoid valve 104 is de-energized to open the backwash drain valve 90 and the air solenoid valve 60 is de-energized (closed) to stop the air flow through the measurement tube. When the time equals 5.0 seconds, at 576 the mix tank water supply valve 20 is energized (opened) to cause water to flow into the mix tank and the air solenoid valve 98 is de-energized to open the flush valve 16. Water is then allowed to flow through the measurement tube assembly until the time equals 13.0 seconds, at which point the mix tank water valve 20 is de-energized at 577 to stop the water flow. At 578, when the time equals 17.0 seconds, air valve 98 is energized to close the flush valve 16, backwash water and air valves 78 and 84 are energized (opened), drain valve 66 is energized (closed), and water supply valve 48 is energized (opened); water and air then flow into the measurement tube and out through the backwash drain valve 90. The time is reset to zero when the flow begins, and when the time is equal to 17.0 seconds, at 579 the water supply valve 48 is de-energized (closed), and when the time is equal to 25.0 seconds, at 580 the air valve 104 is energized to close the backwash drain valve 90, the air valve 60 is energized (opened), the backwash water and air valves 78 and 84 are de-energized (closed), and the drain valve 66 is de-energized (opened); compressed air thereby enters the measurement tube through air inlet 29 to pressurize the tube in order to force any remaining water out of the tube and to the drain line 64. When the time equals 30.0 seconds, at 581 the air valve 60 is de-energized (closed) to stop pressurizing the measurement tube, and when the time equals 34.0 seconds at 582 the air valves 98 and 104 are de-energized to open the flush valve 16 and backwash drain valve 90. The program then returns to the calling subroutine (Subroutine H in the case of a sample run, or Subroutines C, D, or E in the case of a standard run) at 583, and the control subroutine is complete.

Figure 6:
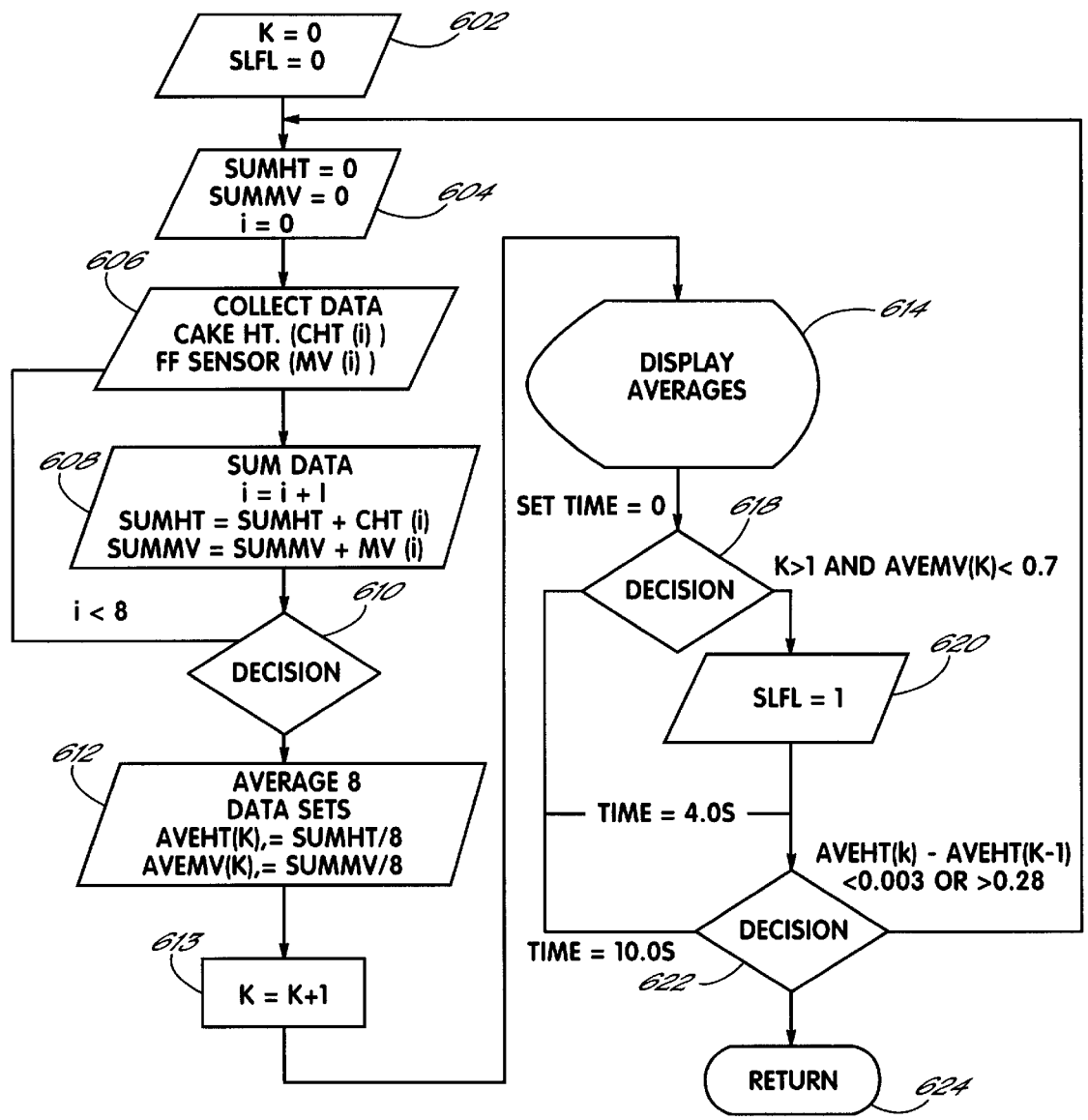
FIG. 6 depicts the control program subroutine for determining when the cake has been formed and when the flow should be diverted to the slow-flow tube.

As discussed above, at step 557 the control Subroutine J calls a Subroutine L (Cake Set Check) in order to determine when the filter cake has been fully formed on the septum so that the collecting of data may begin. FIG. 6 depicts the steps of Subroutine L. At 602 and 604, working variables K, SLFL, SUMHT, SUMMV, and i are initialized to zero. Eight sets of data are then collected from the cake height detector 110 and the FF sensor 122 and averaged at 606–612. Thus, at 606, a reading is collected from the cake detector 110 and stored in array variable CHT and a reading is collected from the FF sensor 122 and stored in array variable MV. At 608, the cake height and FF data are summed, and at 610 the program loops back to step 606 if less than eight sets of data have been collected. When eight sets of data have been collected, then at 612 the data are averaged. The averaged data are then displayed at 614 and the clock is reset to zero.

At 613, counting parameter K is incremented, and at 618 if K is greater than 1 and AVEMV is less than 0.7 millivolts (i.e., the FF sensor is indicating a flow rate below a predetermined limit at which the flow-measuring accuracy of the FF sensor becomes unacceptable), then SLFL is set equal to 1 at 620; otherwise step 620 is skipped. When the time equals 4.0 seconds, a decision branch is executed at 622: if AVEHT(K)–AVEHT(K–1) is greater than 0.28 millivolts (indicating that the cake has not yet fully formed) or less than 0.003 millivolts (indicating that the cake detector is "locked", which frequently occurs when no clearly defined upper edge of the cake has yet formed), then the subroutine returns to step 604 to repeat the data collection and averaging procedure; otherwise, when two consecutive cake detector readings indicate the the cake is fully formed, then the subroutine waits until the time equals 10.0 seconds and returns to the calling subroutine at 624.

Figure 7:
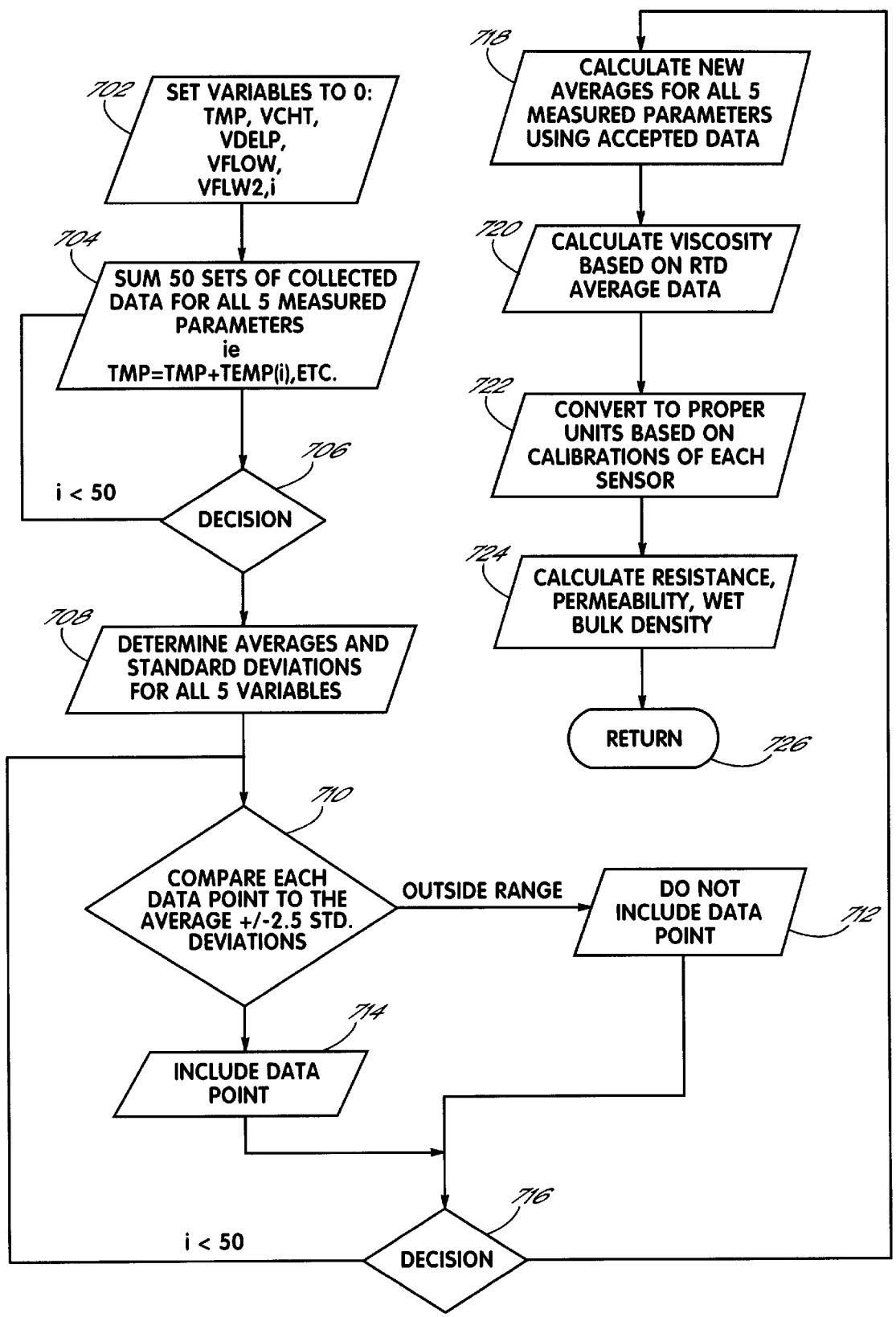
FIG. 7 is a flowchart depicting the control program subroutine for calculating filtration parameters during a sample or standard run cycle.

FIG. 7 depicts the calculation Subroutine K. At 702, summation variables TMP, VCHT, VDELP, VFLOW, VFLW2, and counter i are initialized to zero. At 704 and 706, the 50 sets of data from the RTD sensor, the cake detector, the DP sensor, the FF sensor, and the SF sensor are summed. At 708, averages and standard deviations are determined based on all 50 sets of data. At 710–716, each of the 50 data points for each variable is tested to determine whether the data point is within 2.5 standard deviations of the average; if it is not, the data point is discarded. Then, at 718 new averages for the five measured parameters are calculated using only the accepted data. At 720, viscosity is calculated based on the averaged temperature from the RTD sensor, in accordance with the following equations:

Where T is greater than or equal to 20 degrees C., $$\text{Viscosity} = 10^{((1.3272(20-T)-0.001053(T-20)^2)/(T+105))} \cdot 1.002$$

Where T is less than 20 degrees C., $$\text{Viscosity} = 100 \cdot 10^{((1301/998.333 + (8.1855(T-20)) + 0.00585(T-20)^2)) - 3.30233)}$$

At 722, the data from the five sensors are converted to physical units in accordance with the individual calibrations of the sensors. At 724, the filtration parameters are then calculated in accordance with the following equations, and the subroutine returns to the calling subroutine at 726:

$$\text{Resistance} = \frac{\text{Area}^2 \cdot (\Delta P)}{\text{Mass} \cdot \text{Flow} \cdot \text{Viscosity}}$$

$$\text{Wet Bulk Density} = \frac{\text{Mass} \cdot 62.428}{\text{Area} \cdot \text{Cake Height}}$$

$$\text{Permeability} = \frac{\text{Cake Height} \cdot \text{Viscosity} \cdot \text{Flow}}{\Delta P \cdot \text{Area}}$$

where
Area=cross-sectional area of measurement tube (cm$^2$)
$\Delta P$=pressure drop across the cake (atmospheres)
Mass=mass of the filter aid sample (grams)
Flow=water flow rate through the cake (ml/s)
Cake Height=height of the cake (cm)

The pressure drop across the cake is determined from the millivolt value from the DP sensor taken when no water is flowing ($DP_0$), the millivolt value from the DP sensor when water is flowing at full flow but no sample is present in the measurement tube ($DP_F$), the millivolt value from the FF sensor when water is flowing at full flow but no sample is present ($FF_F$), and the averaged millivolt value from the DP sensor when water is flowing and the filter cake is formed on the septum ($DP_{av}$), in accordance with the following equations:

$$DP_{septum} = (DP_F - DP_O) \cdot (\text{Flow}/(-1.482 + 3.082 \cdot (FF_F/\text{Viscosity}^{.06})^{0.456})$$

$$VDELP = DP_{av} - DP_O - DP_{septum}$$
$$\Delta P = 0.008 + 0.038 \cdot VDELP - 7.8E - 5 \cdot VDELP^2$$

It will be appreciated that these equations for $Dp_{septum}$ and $\Delta P$ are valid only for the particular DP and FF sensors used in arriving at the calibration curves for the sensors and are therefore given for illustrative purposes only. Each sensor has its own unique calibration curve which must be determined and used in the calculations, as is well known in the art.

Figure 8:
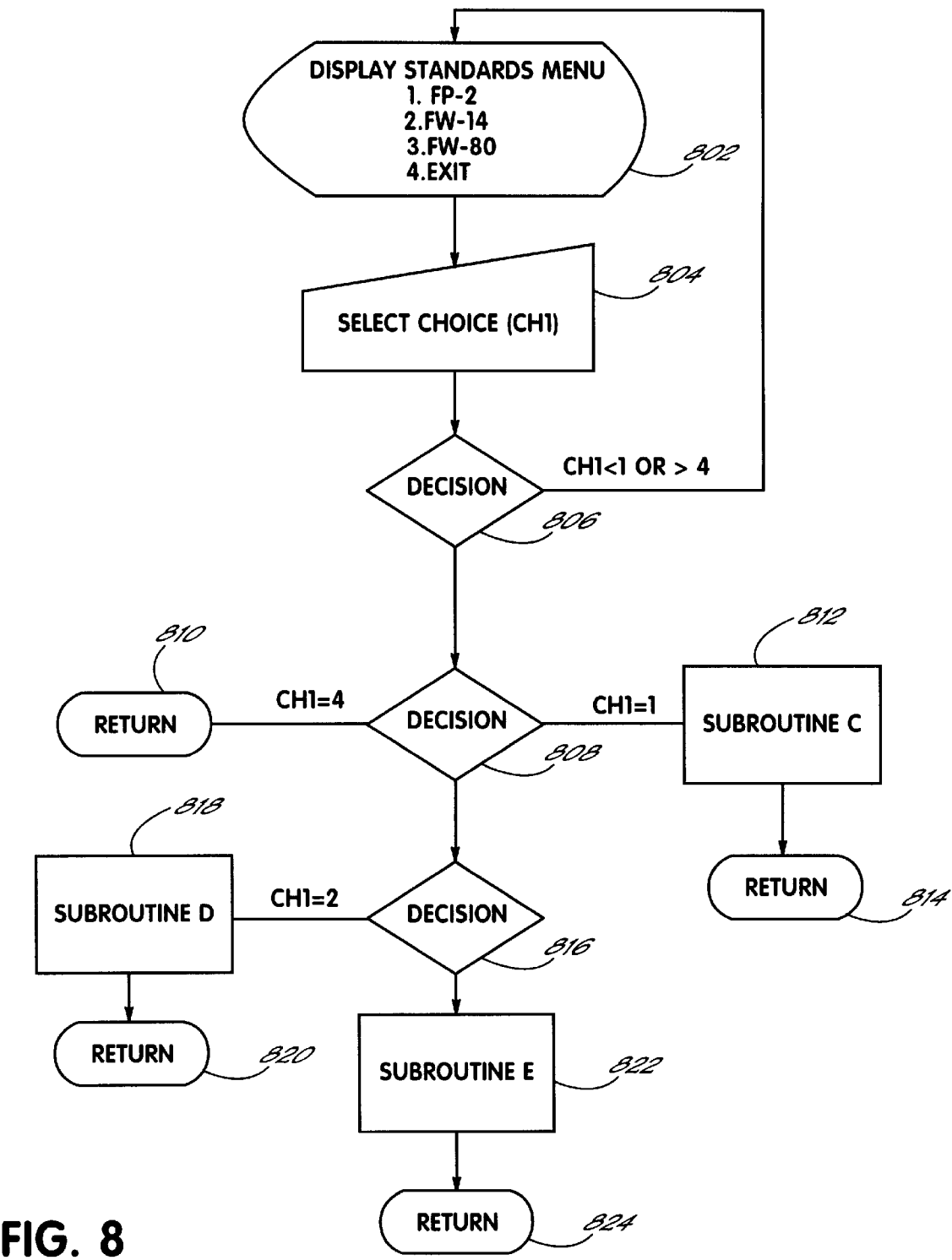
FIG. 8 is a flowchart of the control program subroutine for a standard run cycle of the device.

FIG. 8 depicts the Subroutine B which is called by the main program at 414 (FIG. 4) when the operator has selected a standard run. A standards menu is displayed at 802 prompting the operator to select either FP-2, FW-14, FW-80, or Exit, and at 804 the program reads the operator's selection CH1. At 806, if CH1 is out of range, the program returns to the menu. At 808, if CH1 is equal to 4, the subroutine returns to the calling subroutine at 810; if CH1 is equal to 1, then Subroutine C (FP-2 standard) is called at 812 and the program returns at 814. At 816, if CH1 is equal to 2, then Subroutine D (FW-14 standard) is called at 818 and the program returns at 820; if CH1 is equal to 3, then Subroutine E (FW-80 standard) is called at 822 and the program returns at 824.

Figure 8A:
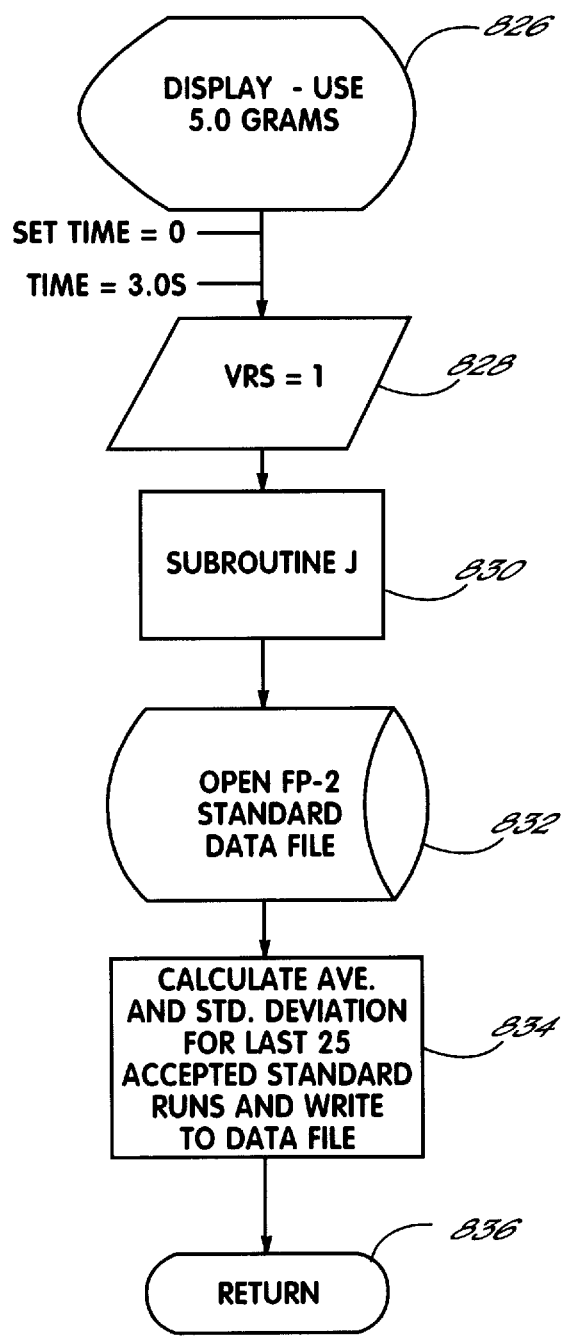
FIG. 8A depicts a flowchart of the control program subroutine which instructs the operator how much standard material to use during a standard run cycle of FP-2 material and which calls subroutines for running a standard and calculating and saving results.

FIG. 8A shows the Subroutine C for the FP-2 standard. The program at 826 displays an instruction for the operator to use 5.0 grams of FP-2 standard material and resets the clock to zero. At 828, when the time is equal to 3.0 seconds a standard-identifying parameter VRS is set to 1 and the control Subroutine J is called at 830. At 832, the program opens a data file which contains the results of calculations of filtration parameters and measured parameters for the last 25 accepted standard runs of FP-2 material. At 834, a subroutine is called which calculates a new average and standard deviations for the current standard run and the previous 24 accepted standard runs of FP-2 material and writes the data to the data file. The program then returns to the calling subroutine at 836.

Subroutines D and E are similar to Subroutine C, except that Subroutine D instructs the operator to use 6.0 grams of FW-14 material, while Subroutine E instructs the operator to use 10.0 grams of FW-80 material; Subroutine D sets VRS to 4, while Subroutine E sets VRS to 7; and Subroutines D and E open and write to separate data files containing FW-14 and FW-80 standard run data, respectively.

Figure 9:
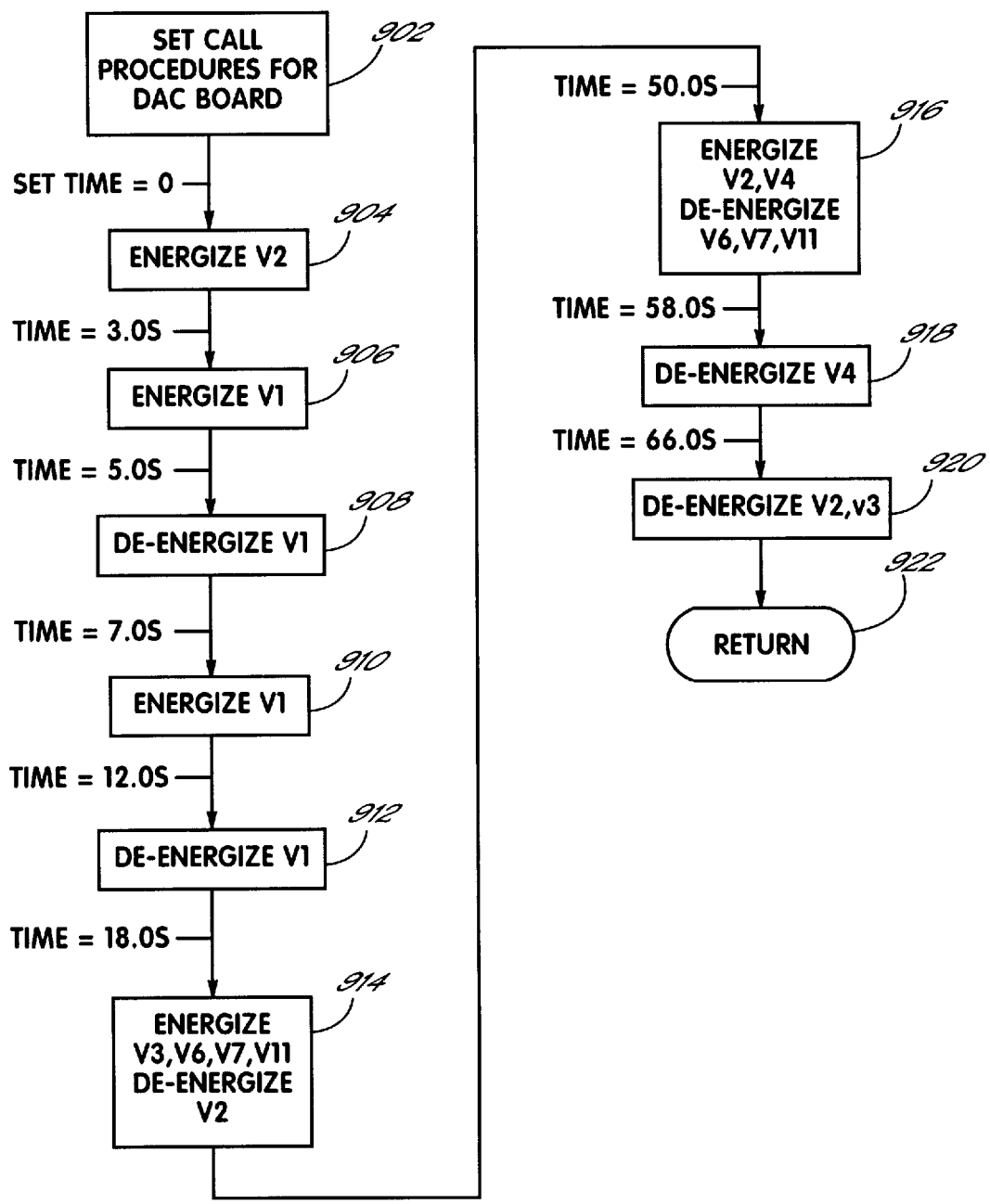
FIG. 9 is a flowchart of the control program subroutine for performing a backwash cycle of the device.

FIG. 9 depicts the operation of the control program when the operator selects a backwash cycle at step 404 (FIG. 4). A backwash cycle is used whenever it is desirable to flush the measurement tube to remove any residue of filter material from a previous sample or standard run. The program begins a backwash cycle at 902 by setting call procedures for the DAC board and resetting the clock time to zero. At 904, the air solenoid valve 104 is energized to close the backwash drain valve 90. When the time equals 3.0 seconds, beginning at 906 and ending at 910 the mix tank water supply valve 20 is alternately energized (opened) and de-energized (closed) to periodically fill the mix tank with water. At this point, flush valve 16 is open and drain valve 66 is open, so that water flows through the measurement tube and out to the drain line 64. When the time equals 18.0 seconds, air valve 98 is energized to close the flush valve 16, backwash water and air valves 78 and 84 are energized to supply water and air to the discharge of the measurement tube, drain valve 66 is energized (closed), and air valve 104 is de-energized to open the backwash drain valve 90. Water and air are allowed to flow upward through the measurement tube and out through valve 90 to drain line 92 until the time equals 50.0 seconds, whereupon at 916 the backwash water and air valves 78 and 84 are de-energized to stop the flow of water and air, drain valve 66 is de-energized (opened), air valve 104 is energized to close the backwash drain valve 90, and air valve 60 is energized (opened) to supply compressed air through the air inlet 29 of the measurement tube assembly in order to force any remaining water out the discharge of the tube. At 918, when the time equals 58.0 seconds, the air valve 60 is de-energized (closed), and at 920, when the time equals 66.0 seconds, air valves 104 and 98 are de-energized. The program at 922 then returns to the main program.

The invention allows filtration parameters for a sample of filter aid to be determined with little human intervention, and in a considerably shorter period of time than is possible with the typical manual procedure. For instance, a sample run for determining permeability of a sample of FW14 material takes approximately 2 to 3 minutes, compared to about 15 minutes for a typical manual procedure.

The invention also achieves more consistent and repeatable measurements of filtration parameters than are usually possible with the typical manual test procedures. In particular, the invention eliminates potential human error associated with reading and recording data manually.

The invention also is portable and relatively compact in size, so that it may be employed in a factory setting anywhere there is access to suitable sources of water, compressed air, and electrical power.

While the present invention has been illustrated by a description of a specific embodiment and while this embodiment has been described in considerable detail, it is not the intention of the applicants to restrict or in any way limit the scope of the appended claims to such detail. Additional advantages and modifications will readily appear to those skilled in the art. For example, the invention may be used in conjunction with an automatic feeding device which is adapted to obtain a sample of filter aid material from a bulk supply of the material, weigh the sample and communicate the weight to the computer, and deposit the sample into the mix tank at the proper time during a sample or standard run cycle. Alternatively, the mix tank may be eliminated, with the device receiving a filter aid slurry from a separate feeding apparatus. Furthermore, the particular types and arrangement of valves illustrated are not critical, and persons of ordinary skill in the art will readily comprehend that other arrangements and types of valves may be substituted therefor. For instance, although the flush valve and backwash drain valve are illustrated as being air-actuated pinch valves, electrically actuated solenoid valves could be used instead. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A device for determining filtration parameters for filter aids, comprising:

a measurement tube assembly including a generally vertical measurement tube having an inlet and a discharge and a septum disposed between the inlet and discharge;

first and second valve means coupled to the inlet and the discharge of the measurement tube assembly, respectively, for controlling water flow into and out of the measurement tube assembly;

a control system adapted to control the first and second valve means in accordance with a predetermined cycle to flush a slurry of filter aid material into the measurement tube assembly and flow water through the measurement tube assembly to form a filter cake on the septum, and thereafter to cause water to flow under pressure through the measurement tube and the filter cake and out the discharge of the measurement tube assembly;

instrumentation means including cake measuring means for measuring the thickness of the filter cake and providing an output signal as a function of said cake thickness, pressure measuring means for measuring the pressure drop across the filter cake and providing an output signal as a function of said pressure drop, and flow measuring means for measuring the rate of water flow through the filter cake and providing an output signal as a function of said flow rate; and a processor connected with the instrumentation means for receiving said output signals from the instrumentation means and calculating filtration parameters therefrom.

2. The device of claim 1, further comprising:

a water pressure regulator which supplies water from a water supply to the measurement tube assembly at a predetermined substantially constant pressure, and wherein:

the first valve means includes a flush valve having an outlet coupled to the inlet of the measurement tube assembly and a measurement tube water supply valve coupling the water regulator to the inlet of the measurement tube assembly; and the second valve means includes a drain valve coupled to the discharge of the measurement tube assembly.

3. The device of claim 2, and further comprising:

a mix tank coupled to an inlet of the flush valve for mixing a sample of filter aid material with water to form a slurry.

4. The device of claim 3, and further comprising:

a mix tank water supply valve coupling the water regulator to the mix tank;

the control system actuating the mix tank water supply valve to open and close in accordance with a predetermined cycle to form a slurry in the mix tank, the control system further actuating the flush valve to open to flush the slurry from the mix tank into the measurement tube assembly.

5. The device of claim 4, wherein the control system and processor comprise a computer, the computer being programmed to operate said first and second valve means in accordance with a predetermined cycle and to acquire data from the instrumentation means and process said data to calculate filtration parameters for a sample of filter aid.

6. The device of claim 5, further comprising:

a temperature sensor providing an output signal as a function of the temperature of the water supply, the computer receiving the temperature output signal and determining water viscosity therefrom for calculating filtration parameters.

7. The device of claim 6, further comprising:

a display unit connected to the computer and operable to display the results of the calculations of filtration parameters.

8. The device of claim 6, wherein the measurement tube water supply valve and mix tank water supply valve are electrically actuated solenoid valves.

9. The device of claim 8, wherein the flush valve is actuatable to a closed position by air pressure, and further comprising:

a pressure-regulated air supply; and a flush air supply valve coupling the air supply to the flush valve;

the computer opening the flush valve by closing the flush air supply valve to shut off air pressure to the flush valve, and closing the flush valve by opening the flush air supply valve to supply air pressure to the flush valve.

10. The device of claim 9, wherein the flush air supply valve is an electrically actuated solenoid valve, the control system electrically actuating the solenoid valve to shut off air pressure to the flush valve so as to open the flush valve.

11. The device of claim 10, further comprising:

a backwash drain line;

a backwash drain valve coupling the inlet of the measurement tube assembly with the backwash drain line;

a backwash water supply valve coupling the water pressure regulator with the discharge of the measurement tube assembly; and a backwash air supply valve coupling the air supply with the discharge of the measurement tube assembly;

the computer being adapted to perform a backwash sequence by closing the measurement tube water supply valve to disconnect the inlet of the measurement tube assembly from the water pressure regulator and closing the measurement tube drain valve to prevent water flow out the discharge of the measurement tube assembly, and opening the backwash drain valve and the backwash water and air supply valves so as to cause water and air to flow into the discharge of the measurement tube assembly to break up the cake and flush the cake upward through the inlet of the measurement tube assembly and to the backwash drain line.

12. The device of claim 11, further comprising:

an electrically actuated backwash solenoid valve connected between the air supply and the backwash drain valve;

the computer during a backwash sequence electrically actuating the backwash solenoid valve to shut off air pressure to the backwash drain valve so as to open the backwash drain valve.

13. The device of claim 12, further comprising:

a three-way valve downstream of the measurement tube drain valve, the three-way valve having an inlet and first and second outlets, the inlet of the three-way valve being connected to the outlet of the measurement tube drain valve, the three-way valve being selectively positionable between a first position in which flow is directed through the first outlet to a drain line and a second position in which flow is directed through the second outlet;

a slow flow tube having an inlet connected to the second outlet of the three-way valve and a discharge connected to a slow-flow drain line;

a slow flow drain valve connected between the discharge of the slow flow tube and the slow-flow drain line; and a low range differential pressure sensor in fluid communication with the slow flow tube and providing an output signal as a function of the pressure exerted by a column of fluid in the slow flow tube;

the computer being adapted, while water is flowing through the measurement tube water supply valve and measurement tube assembly, to actuate the three-way valve to the second position to cause water to flow from the discharge of the measurement tube assembly to the slow flow tube and to actuate the slow-flow drain valve to close, the control system so actuating the slow-flow drain valve and three-way valve in response to a flow rate below a predetermined level, the control system receiving the output signal from the low-range differential pressure sensor and calculating said flow rate from said output signal.

14. The device of claim 13, further comprising:

a purge air valve connected between the air supply and the inlet of the measurement tube assembly;

the computer being adapted, after the cake has been broken up and carried through the backwash drain valve to the backwash drain line, to close the backwash drain valve and open the purge air valve and the measurement tube drain valve so as to cause air to flow through the measurement tube assembly and force any water remaining in the measurement tube assembly out the discharge to prepare the device for the start of another cycle.

15. The device of claim 14, wherein the flow measuring means comprises:

an orifice downstream of the measurement tube assembly and a differential pressure sensor providing an output signal as a function of the pressure drop across the orifice, the computer calculating flow rate from said output signal.

16. A device for determining filtration parameters for filter aids, the device being adapted to be connected to a water supply, the device comprising:

a measurement tube assembly including a generally vertical measurement tube having an inlet and a discharge and a septum disposed between the inlet and discharge;

a flush valve coupled to the inlet of the measurement tube assembly;

a measurement tube water supply valve coupling the water supply to the inlet of the measurement tube assembly;

a drain line coupled to the discharge of the measurement tube assembly;

a flow measurement device providing an output signal as a function of the rate of flow through the measurement tube assembly;

a cake detector providing an output signal as a function of the thickness of a cake of filter aid material formed on the septum;

a differential pressure sensor connected across the measurement tube assembly providing an output signal as a function of the pressure drop across the measurement tube assembly; and a computer operable in accordance with a predetermined cycle to open the flush valve to permit a slurry of filter aid material to enter the measurement tube assembly, and thereafter to close the flush valve and open the measurement tube water supply valve to cause water to flow through the measurement tube assembly to the drain line so that a cake of the filter aid material forms on the septum, the computer being adapted to receive the output signals from the flow measurement device and the differential pressure sensor and cake detector and calculate filtration parameters for the filter aid material.

17. The device of claim 16, and further comprising:

a water pressure regulator which supplies water from the water supply to the measurement tube water supply valve at a substantially constant pressure.

18. The device of claim 17 further comprising:

a mix tank coupled to an inlet of the flush valve for mixing a sample of filter aid material with water to form a slurry; and a mix tank water supply valve coupling the water pressure regulator to the mix tank;

the computer actuating the mix tank water supply valve to open and close in accordance with a predetermined cycle to form said slurry of filter aid material in the mix tank and actuating the flush valve to open to flush the slurry from the mix tank into the measurement tube assembly.

19. The device of claim 16, and further comprising:

a drain valve coupled to the discharge of the measurement tube assembly;

the computer opening and closing the drain valve to control water flow out of the discharge of the measurement tube assembly.

20. The device of claim 16, and further comprising:

a temperature sensor providing an output signal to the computer as a function of the temperature of the water supply.

21. The device of claim 16, and further comprising a slow-flow measuring system including:

a three-way valve downstream of the measurement tube discharge, the three-way valve having an inlet and first and second outlets, the inlet of the three-way valve being connected to the discharge of the measurement tube, the three-way valve being selectively positionable between a first position in which flow is directed through the first outlet to a drain line and a second position in which flow is directed through the second outlet;

a slow flow tube having an inlet connected to the second outlet of the three-way valve and a discharge connected to a slow-flow drain line;

a slow flow drain valve connected between the discharge of the slow flow tube and the slow-flow drain line; and a pressure sensor in fluid communication with the slow flow tube and providing an output signal as a function of the pressure exerted by a column of fluid in the slow flow tube.

* * * * *